United States Patent Office
3,445,495
Patented May 20, 1969

3,445,495
POLYMERS AND TELOMERS OF SILACYCLOBUTANES
Lee E. Nelson, Midland, Mich., assignor to Dow Corning Corporation, Midland, Mich., a corporation of Michigan
No Drawing. Continuation-in-part of application Ser. No. 377,492, June 24, 1964. This application May 6, 1966, Ser. No. 547,750
Int. Cl. C07f 7/02; C08g 47/02
U.S. Cl. 260—448.2                                             11 Claims

ABSTRACT OF THE DISCLOSURE

Silacyclobutanes and disilacyclobutanes are polymerized by reaction of the monomer in the presence of a platinum-containing material as catalyst. Novel polymers and telomers are useful fluids, gums and resins. An example is the reaction of 1,1-dimethyl-1-silacyclobutane and phenyldimethylsilane in the presence of chloroplatinic acid for 3 hours at 100° C. to produce

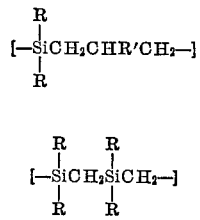

This invention which is a continuation-in-part of U.S. application No. 377,492, filed June 24, 1964, now abandoned, relates to polymers and telomers of silacyclobutanes and disilacyclobutanes. The products of this invention are fluids, gums, and hard materials which are useful lubricants, resins, and dielectric fluids.

Silacyclobutanes are known compounds which can generally be prepared by the following reaction:

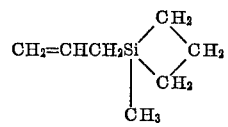

where R is a monovalent hydrocarbon radical or a beta-(perfluoroalkyl)ethyl radical, and R' is a lower alkyl radical or a hydrogen atom. Heating is generally not required, though the reaction often requires initiation with a trace of methyl iodide.

By this reaction, silacyclobutanes such as 1,1 - dimethyl-1 - silacyclobutane; 1,3 - dimethyl - 1 - phenyl - 1 - silacyclobutane; 1,1,3 - trimethyl - 1 - silacyclobutane; 1-trifluoropropyl - 1 - vinyl - 3 - propyl - 1 - silacyclobutane; 1-octadecyl - 1 - tolyl - 3 - ethyl - 1 - silacyclobutane; etc. can be formed.

1,1-diphenyl - 1 - silacyclobutane, among others, can be made by reacting phenylmagnesium bromide with 1,1-dichloro - 1 - silacyclobutane in tetrahydrofuran. The reaction proceeds at room temperature.

Disilacyclobutanes can be made by a similar reaction to the one above, using as a starting product one or more silanes of the formula

where R is as defined above.

This invention relates to a method of polymerizing a compound of the formula selected from the group consisting of
(a)

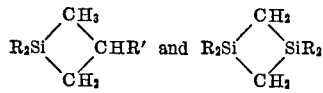

where R is selected from the group consisting of monovalent hydrocarbon radicals free of aliphatic unsaturation and beta(perfluoroalkyl)ethyl radicals, and $R^1$ is selected from the group consisting of lower alkyl radicals and hydrogen atoms, comprising contacting said compound under substantially anhydrous conditions with such amount of
(b) A platinum-containing material that there is at least 0.0001 weight percent of platinum present, based on the weight of (a)+(b).

The polymers produced by the above process contain units of the formula

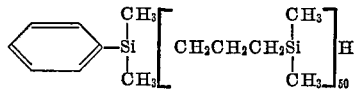

and/or

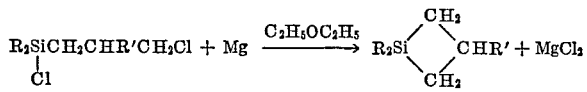

the symbols being defined above.

Copolymers can be made by starting with a mixture of more than one type of ingredient (a).

Other copolymerizable ingredients can be added in minor amounts to the reaction mixture, if desired. For example, although presence of aliphatic unsaturation inhibits the polymerization reaction of this application, silacyclobutanes and disilacyclobutanes which contain aliphatically unsaturated substituents, e.g.

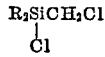

can be added in minor amounts of about 10 mole percent or less to ingredient (a) to obtain copolymers which contain a few aliphatically unsaturated substituent groups.

R can be any monovalent hydrocarbon radical e.g., alkyl radicals such as methyl, ethyl, propyl, isohexyl, and octadecyl; alicyclic radicals such as cyclohexyl and cyclopentyl, and aromatic-containing radicals such as phenyl, xenyl, naphthyl, tolyl, and benzyl. R can also be any beta-(perfluoroalkyl)ethyl radical such as 3,3,3 - trifluoropropyl, beta-(perfluoroethyl)ethyl, (i.e.

[C$_2$F$_5$]CH$_2$CH$_2$—)

beta - (perfluorohexyl)ethyl, and beta - (perfluorooctyl) ethyl.

R' can be a hydrogen atom or any lower alkyl radical such as methyl, ethyl, isopropyl, sec-butyl, or hexyl.

(b) Can be any platinum-containing material as defined above such as chloroplatinic acid, complexes of platinum and olefins, complexes of platinum and amines, platinum adsorbed on carbon or alumina, platinum powder, platinum mesh, and other forms of metallic platinum. Preferably, the platinum should be in a finely divided state. It can be seen that the term "platinum containing material" includes platinum per se, compounds of platinum, and mixtures of platinum with other materials.

There is no upper limit to the amount of platinum allowable in the reaction mixture except for the unreasonable situation where a huge proportion of platinum dilutes the reactants to the vanishing point, but it is preferred for there to be at least 0.001 weight percent of platinum present, based on the weight of (a) and (b).

The reaction temperature is likewise not critical, but it is preferred to run the reaction from 80° to 150° C. in order to get a rapid reaction rate. The reaction proceeds at temperatures below the decomposition temperature of the product.

By "substantially anhydrous conditions" it is meant that water must not be added to the reaction mixture. The small amounts of water found in the air, etc. can be tolerated by the reaction.

This application also relates to the process of reacting, under substantially anhydrous conditions, (a)

(1) From 0.001 to 80 mol percent of $HSiR''_3$ with
(2) From 20 to 99.999 mol percent of

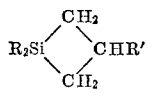

where

R is selected from the group consisting of monovalent hydrocarbon radicals free of aliphatic unsaturation and beta-(perfluoroalkyl)ethyl radicals, R' is selected from the group consisting of lower alkyl radicals and hydrogen atoms, and R'' is selected from the group consisting of monovalent hydrocarbon and halohydrocarbon radicals free of aliphatic unsaturation, halogen, alkoxy, acyloxy, and R-substituted siloxane radicals, in the presence of such amount of (b)

A platinum-containing material that there is at least 0.0001 weight percent of platinum present, based on the weight of (a)+(b); whereby a material of the formula selected from the group consisting of

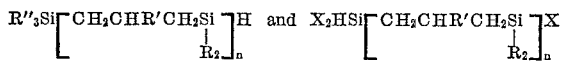

is formed, where $n$ has a value of at least 1 and X is a halogen atom.

$n$ preferably has a value of at least 10.

In the above process, and in the processes disclosed below, the value of $n$ depends at least in part on the ratio of (1) to (2). The higher the proportion of (2), the larger the value of $n$. When approximately equimolar quantities of (1) and (2) are present, or there is more (1) than (2), $n$ will equal 1 in a large proportion of the product.

Usually a number of products are recovered, $n$ being of different values.

Examples of R and R' are illustrated above.

R'' can be any monovalent hydrocarbon radical free of aliphatic unsaturation, examples of which are illustrated above, as are examples of the platinum-containing material.

R'' can also be any monovalent halohydrocarbon radical free of aliphatic unsaturation, i.e. haloalkyl radicals such as beta-chloroethyl, 3,3,3-trifluoropropyl, beta-(perfluorohexyl)ethyl, and bromooctadecyl; haloalicyclic radicals such as chlorocyclohexyl and iodocyclohexyl; and haloaryl radicals such as chlorophenyl, bromonaphthyl, $\alpha,\alpha,\alpha$-trifluorotolyl, and chlorobenzyl.

R'' likewise can be any halogen such as chlorine or fluorine; any alkoxy radical such as methoxy, ethoxy, or isohexoxy; any acyloxy radical such as acetate, formate, or butyrate; and any R-substituted siloxane radical, by which is meant any monovalent siloxane radical, the free valence being on a silicon-bonded oxygen atom, and the remaining valences being filled with R groups, as defined above.

Examples of these siloxane radicals include the pentamethyldisiloxy, 3,3,3-trifluoropropyltetramethyldisiloxy, phenyltetramethyldisiloxy, octadecylhexamethyltrisiloxy, isopropyldecamethylpentasiloxy, and polymethyldecasiloxy groups.

The maximum ratio of platinum to the reaction mixture is not critical, nor is the reaction temperature. It is, however, preferred for there to be at least 0.001 weight percent of platinum present in the reaction mixture, based on the weight of (a) and (b). It is also preferred to run the reaction from 80° to 150° C. in order to get a rapid reaction rate. The reaction, however, also proceeds at below room temperature and at temperatures higher than 150° C.

The general product is

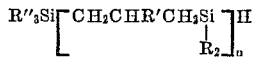

The product

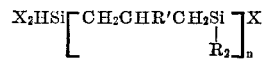

is formed as a special case of the general process shown above. It has been found that when all the R'' groups of ingredient (1) are halogen, (in which situation they are here relabeled as X groups), a large proportion of the product is the X group-endblocked material shown above rather than the hydrogen-endblocked material that is usually produced. Examples of halogen groups are F, Cl, Br, and I. The reaction conditions and proportions of this special case reaction are similar to the general reaction.

This application also relates to the process of reacting under substantially anhydrous conditions (a)

(1) From 0.001 to 80 mol percent of $HSiR''_3$ with
(2) From 20 to 99.999 mol percent of

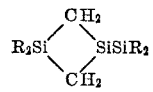

where

R is selected from the group consisting of monovalent hydrocarbon radicals free of aliphatic unsaturation and beta-(perfluoroalkyl)ethyl radicals, and R'' is selected from the group consisting of monovalent hydrocarbon and halohydrocarbon radicals free of aliphatic unsaturation, halogen, alkoxy, acetoxy and R-substituted siloxane radicals, in the presence of such amount of (b)

A platinum-containing material that there is at least 0.0001 weight percent of platinum present, based on the weight of (a)+(b); whereby a material of the formula selected from the group consisting of

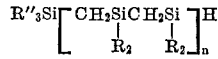

and

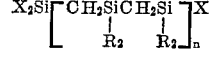

is formed, where $n$ has a value of at least 1 and X is a halogen atom.

Examples of the R and R'' groups are shown above, as are examples of platinum-containing materials. It is once again preferred for $n$ to have a value of at least 10.

This process proceeds under similar conditions, and with the same proportions of catalyst, as the previously-disclosed reactions. It is once again preferred for there to be at least 0.001 weight percent of platinum present in the reaction mixture, based on the weight of (a) and (b) and for the reaction to run at a temperature of 80° to 150° C. in order to get a desirable reaction rate, though the reaction temperature is not critical to the functioning of the reaction.

The general product is

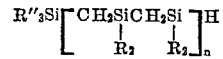

There is also a special case of this reaction. The product

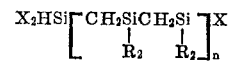

is formed when all the R'' groups of ingredient (1) are halogen. The reaction conditions and proportions of this special case reaction are similar to the general reaction. Examples of R, X, and platinum-containing materials are shown above.

The following examples are illustrative only and should not be construed as limiting the invention which is properly delineated in the appended claims.

Example 1

To 0.4361 gram of 1,1-dimethyl-1-silacyclobutane was added 0.0047 gram of a solution of chloroplatinic acid in dimethyl phthalate (1 weight percent Pt). This was sealed in a Pyrex glass tube.

The tube was heated at 100° C. for 3 hours. The product was found to be a polymer comprising

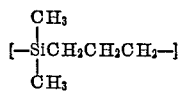

units.

Nuclear magnetic resonance studies showed that all the silacyclobutane was consumed.

Example 2

To 0.5 cc. of 1,1-dimethyl-1-silacyclobutane was added a trace of carbon with 0.25 weight percent adsorbed platinum. This was placed in a Pyrex glass tube, which was then heated at 100° C. for 2½ hours.

The residue was found to be a polymer comprising

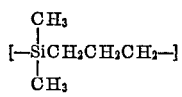

units.

Example 3

To 1.2 grams of 1,3-dimethyl-1-phenyl-1-silacyclobutane was added 0.01 gram of a solution of chloroplatinic acid in dimethyl phthalate (1 weight percent Pt). This was sealed in a Pyrex glass tube and heated at 100° C. for 2¾ hours. The product was dissolved in diethylether to extract it from the tube.

On evaporation of the ether, a transparent, odorless, flowable, tacky material remained, being a polymer comprising

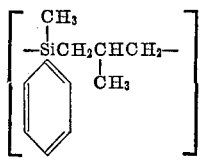

units.

Example 4

The following were sealed in a Pyrex glass tube: 0.3634 gram of 1,1,3-trimethyl-1-silacyclobutane and 0.0034 gram of a solution of chloroplatinic acid and dimethyl phthalate (1 weight percent Pt). This was heated at 100° C. for 3 hours to yield a colorless, transparent, tacky polymer comprising

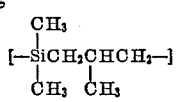

units.

Example 5

The following were sealed in a Pyrex glass tube: 1.08 grams of 1,1-diphenyl-1-silacyclobutane and 0.01 gram of a solution of chloroplatinic acid and dimethyl phthalate (1 weight percent Pt). This was for 3 hours at 100° C. to yield a colorless, clear, tough polymer that would not readily dissolve in diethyl ether, but was slowly soluble in $CCl_4$ or benzene.

No unreacted monomer remained.

On evaporating a benzene solution of the polymer, a tough, high-melting film resulted which was a polymer comprising

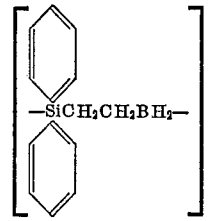

units.

Example 6

When the following silacyclobutanes are contacted with 0.001 weight percent of finely-divided platinum, polymers comprising the following units result.

| Silacyclobutane | Polymer unit |
|---|---|
| $CF_3CH_2CH_2Si\begin{smallmatrix}CH_2\\ \diagdown\\ \diagup\\ CH_2\end{smallmatrix}CHC_2H_5$ with $CH_3$ | $\begin{bmatrix}CH_3\\ \|\\ -SiCH_2CHCH_2-\\ \|\quad\|\\ CH_2\ C_2H_5\\ \|\\ CH_2\\ \|\\ CF_3\end{bmatrix}$ |
| $C_{13}H_{26}Si\begin{smallmatrix}CH_2\\ \diagdown\\ \diagup\\ CH_2\end{smallmatrix}CHC_4H_9$ with $C_4H_9$ | $\begin{bmatrix}C_{13}H_{26}\\ \|\\ -SiCH_2CHCH_2-\\ \|\quad\|\\ C_4H_9\ C_4H_9\end{bmatrix}$ |
| $C_4F_9CH_2CH_2Si\begin{smallmatrix}CH_2\\ \diagdown\\ \diagup\\ CH_2\end{smallmatrix}CHC_6H_{13}$ with phenyl | $\begin{bmatrix}\text{phenyl}\\ \|\\ -SiCH_2CHCH_2-\\ \|\quad\|\\ CH_2\ C_6H_{13}\\ \|\\ CH_2\\ \|\\ C_4F_9\end{bmatrix}$ |

Example 7

Into a Pyrex glass tube were placed: 2.3 grams ($2.3 \times 10^{-2}$ mole) of 1,1-dimethyl-1-silacyclobutane, 3.2 grams ($2.3 \times 10^{-2}$ mole) of phenyldimethylsilane, and 0.05 gram of a solution of chloroplatinic acid and dimethyl phthalate (1 weight percent platinum). The tube was sealed and heated at 100° C. for 6 hours. Analysis showed that all of the silacyclobutane was consumed, that some phenyldimethylsilane remained, and that a series of higher boiling compounds had been produced.

The two most abundant products were found to have the formulae:

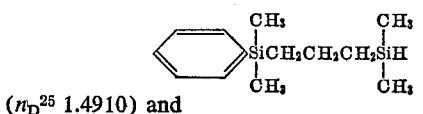

($n_D^{25}$ 1.4910) and

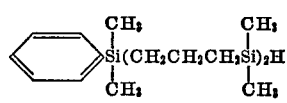

$n_D^{25}$ 1.4860).

Example 8

Into a Pyrex glass tube were placed: 0.6803 gram ($6.8 \times 10^{-3}$ mole) of 1,1-dimethyl-1-silacyclobutane, 1.28 grams ($6.7 \times 10^{-3}$ mole) of diphenylmethylsilane, and 0.0184 gram of the chloroplatinic acid solution of Example 7. The tube was sealed and heated at 100° C. for 3 hours.

High-boiling products were recovered. The two most abundant products were

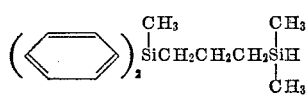

($n_D^{25}$ 1.5391)

and

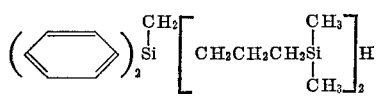

($n_D^{25}$ 1.5206).

Example 9

Into a Pyrex glass tube were placed: 1.00 gram ($1.0 \times 10^{-2}$ mole) of 1,1-dimethyl-1-silacyclobutane, 0.94 gram ($1.0 \times 10^{-2}$ mole) of dimethylchlorosilane, and 0.03 gram of the chloroplatinic acid solution of Example 7. The tube was heated for 3 hours at 100° C.

A sizeable portion of

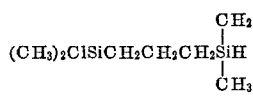

($n_D^{25}$ 1.4359) was recovered.

Example 10

Into a Pyrex glass tube were placed: 1.50 grams ($1.50 \times 10^{-2}$ mole) of 1,1-dimethyl-1-silacyclobutane, 3.46 grams ($3.0 \times 10^{-2}$ mole) of methyldichlorosilane, and 0.04 gram of the chloroplatinic acid solution of Example 7. The tube was sealed and heated at 100° C. for 3 hours.

Among the products present were

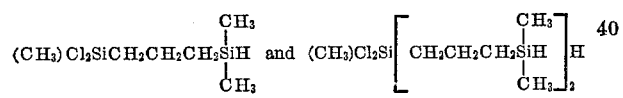

Example 11

Into a Pyrex glass tube were placed: 1.0 gram ($1.0 \times 10^{-2}$ mole) of 1,1-dimethyl-1-silacyclobutane, 1.48 grams ($1.0 \times 10^{-2}$ mole) of pentamethyldisiloxane and 0.03 gram of the chloroplatinic acid solution of Example 7. The tube was sealed and heated for 3 hours at 100° C.

The two major products were

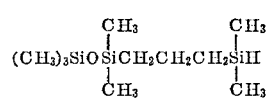

($n_D^{25}$ 1.4149) and

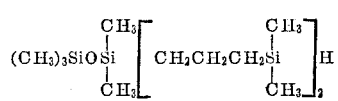

($n_D^{25}$ 1.4438).

Example 12

Into a Pyrex glass tube was placed 1.0 gram ($1.0 \times 10^{-2}$ mole) of 1,1-dimethyl-1-silacyclobutane, 0.03 gram ($2.2 \times 10^{-4}$ mole) of phenyldimethylsilane, and 0.01 gram of the chloroplatinic acid solution of Example 7. The tube was sealed and heated at 100° C. for 3 hours.

The product was dissolved in benzene. Analysis showed no trace of the reactants remaining. The benzene solution was evaporated in a vacuum desiccator, leaving a powdery solid with a melting point of 42.0 to 42.5° C. The product had the formula

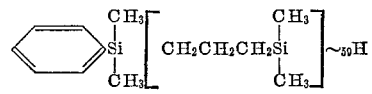

Example 13

The reaction of approximately equal amounts of the following reactants in the presence of platinum at 100° C. gives the following products:

| Reactants | Products |
|---|---|
| (a) 1,1,3-trimethyl-1-silacyclobutane | ⟨⟩Si(CH₃)(CH₃)CH₂CHCH₂SiH(CH₃)CH₃  ($n_D^{25}$ 1.4910) |
| Phenyldimethylsilane | ⟨⟩Si(CH₃)(CH₃)[CH₂CHCH₂Si(CH₃)]₂H ($n_D^{25}$ 1.4899) |
| (b) 1,1,3-trimethyl-1-silacyclobutane | (CH₃)₃SiOSi(CH₃)(CH₃)CH₂CHCH₂SiH(CH₃)CH₃ ($n_D^{25}$ 1.4194) |
| Pentamethyldisiloxane | (CH₃)₃SiOSi(CH₃)(CH₃)[CH₂CHCH₂Si(CH₃)]₂H ($n_D^{25}$ 1.4396) |
| (c) 1,3-dimethyl-1-phenyl-1-silacyclobutane | ⟨⟩Si(CH₃)(⟨⟩)CH₂CHCH₂SiH(CH₃)CH₃ ($n_D^{25}$ 1.5350) |
| Phenyldimethylsilane | |
| (d) 1,1-dimethyl-1-silacyclobutane | Cl₂HSiCH₂CH₂CH₂SiCl(CH₃)(CH₃) ($n_D^{25}$ 1.4564) |
| Trichlorosilane. | |

Example 14

When the following reactants are heated at 80° C. in the presence of platinum, the following products are formed:

| Reactants [1] | Product |
|---|---|
| (a) $CF_3CH_2CH_2SiH(OCH_3)_2$ <br><br> $CF_3CH_2CH_2Si(CH_3)$ (cyclic with $CH_2CH_2CH_2$) | $CF_3CH_2CH_2Si(OCH_3)_2-CH_2CH_2CH_2-Si(H)(CH_3)-CH_2CH_2CF_3$ |
| (b) $CF_3CH_2CH_2SiO(CH_3)–[SiO(CH_3)(CH_2CH_2CF_3)]_5–$ <br><br> $–SiH(OCCH_3)_2$ (with C=O) <br><br> $C_5F_{11}CH_2CH_2Si(C_3H_7)$ (cyclic with $CH_2CH_2CHC_4H_9$) | $CF_3CH_2CH_2SiO(CH_3)–[SiO(CH_3)(CH_2CH_2CF_3)]_5–Si[CH_2CH(C_4H_9)CH_2–]O(OCCH_3)_2$ <br><br> $C_5F_{11}CH_2CH_2–Si_2H(C_3H_7)$ |
| (c) $C_{18}H_{37}SiH(OC_2H_5)_2$ (.1 mole) <br><br> $C_{18}H_{37}Si(C_6H_5)$ (cyclic with $CH_2CH_2CH_2$) (10 moles) | $C_{18}H_{37}Si(OC_2H_5)_2–[CH_2CH_2CH_2Si(C_{18}H_{37})(C_6H_5)]_{100}–H$ |
| (d) $CH_3$–(Br,thiophene-C_6H_4)–SiH–(Cl,thiophene-C_6H_4) (0.1 mole) <br><br> $(thiophene)$–Si(CH_3)(CH_2CHC_6H_{13}CH_2–) cyclic (5 moles) | $CH_3$–(Br,thiophene-C_6H_4)–Si[CH_2CH(C_6H_{13})CH_2–Si(CH_3)(thiophene)]_{50}H, (Cl,thiophene)-substituted |

See footnotes at end of table.

| Reactants[1] | Product |
|---|---|
| (e) <br><br> Br₃ <br> \| <br> SiH (0.1 mole) <br><br> $C_6H_{13}Si\begin{matrix}CH_2\\ \diagup\quad\diagdown\\ CH_3\end{matrix}\begin{matrix}\\ CH_2\\ CH_2\end{matrix}$ (20 moles) | $HS\overset{Br_2}{\underset{\quad}{i}}\left[CH_2CH_2CH_2\overset{C_6H_{13}}{\underset{CH_3}{Si}}\right]_{200}Br$ |
| (f) Diphenylmethylsilane <br><br> 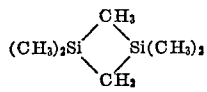 | 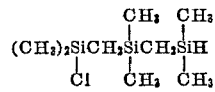 |
| (g) <br><br> F₃ <br> \| <br> SiH <br><br> 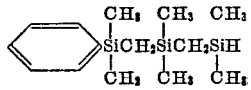 | $HS\overset{F_2}{\underset{\quad}{i}}[CH_2\overset{CH_3}{\underset{\quad}{C}}HCH_2\overset{CH_3}{\underset{CH_3}{S}}i]_2F$ |

[1] Equimolar parts except where stated.

Example 15

(a) The following was placed in a Pyrex glass tube: 0.22 gram of $(CH_3)_2Si\begin{matrix}CH_2\\ \diagup\quad\diagdown\\ CH_2\end{matrix}Si(CH_3)_3$ 0.21 gram of phenyldimethylsilane, and 0.0061 gram of platinum in the form of chloroplatinic acid which has been reduced with pentamethyldisiloxane. The tube was heated for 3¾ hours at 100° C. to yield a high-boiling product of the formula $\bigcirc\!\!\!-\!\!\!\overset{CH_3}{\underset{CH_3}{Si}}CH_2\overset{CH_3}{\underset{CH_3}{Si}}CH_2\overset{CH_3}{\underset{CH_3}{Si}}H$ (b) Substitution of the phenyldimethylsilane ingredient in the reaction of (a) above with dimethylchlorosilane results in the production of $(CH_3)_2Si CH_3\overset{CH_3}{\underset{\quad}{Si}}CH_3\overset{CH_3}{\underset{\quad}{Si}}H$
$\ \ Cl\ \ \ \ \ \ \ CH_3\ \ CH_3$ Example 16

When the following reactants are heated to 120° C. in the presence of platinum, the following products are formed:

| (a) 1 mole of $HS\overset{(OCH_3)_2}{\underset{\quad}{i}}CH_2CH_2CF_3$ <br><br> 2 moles of $CF_3CH_2CH_2Si\begin{matrix}CH_2\\ \diagup\quad\diagdown\\ CH_2\end{matrix}SiCH_2CH_2CF_3$ <br> 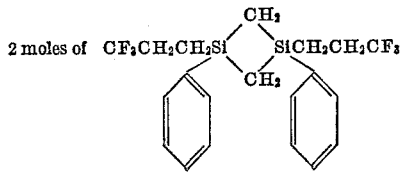 | 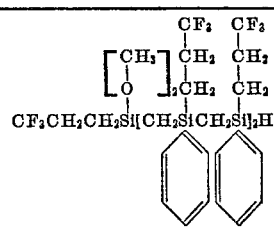 <br> $CF_3CH_2CH_2Si[CH_2SiCH_2Si]_2H$ |

| | |
|---|---|
| (b) 1 mole of $HSiOSi(CH_3)_3$ with $(O\overset{O}{\underset{\|}{C}}CH_3)_2$ <br><br> 3 moles of 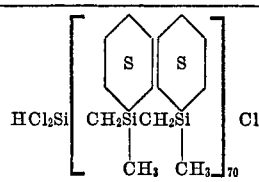 with $CH_2$, $C_{18}H_{37}Si$, $SiC_{18}H_{37}$, $C_2H_5$, $CH_2$, $C_2H_5$ | 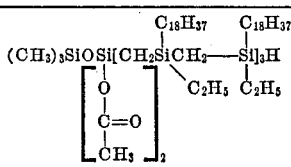 $(CH_3)_3SiOSi[CH_2SiCH_2\text{---}Si]_3H$ with $C_{18}H_{37}$, $C_{18}H_{37}$, $C_2H_5$, $C_2H_5$, and $\begin{bmatrix}O\\|\\C=O\\|\\CH_3\end{bmatrix}_2$ |
| (c) 1 mole of $HSiCl_3$ <br><br> 70 moles of 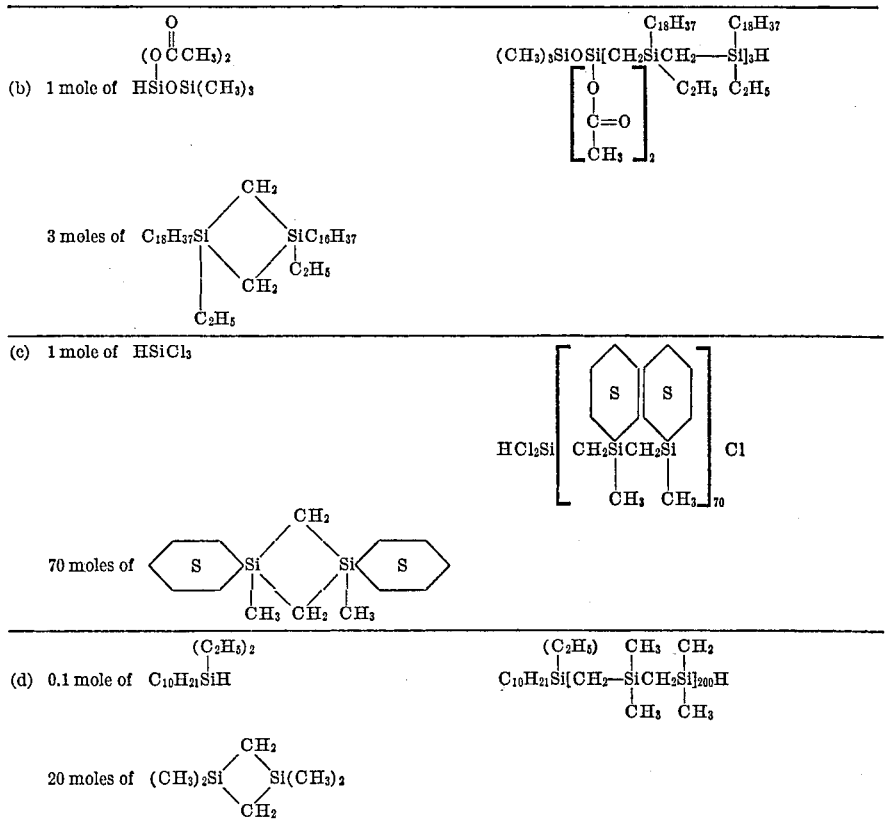 | $\begin{bmatrix}\text{structure}\end{bmatrix}_{70}$ with $HCl_2Si$, $CH_2SiCH_2Si$, $Cl$, $CH_3$, $CH_3$ |
| (d) 0.1 mole of $C_{10}H_{21}\overset{(C_2H_5)_2}{\underset{\|}{Si}}H$ <br><br> 20 moles of $(CH_3)_2Si\underset{CH_2}{\overset{CH_2}{\diagdown\diagup}}Si(CH_3)_2$ | $C_{10}H_{21}Si[CH_2\text{---}SiCH_2Si]_{200}H$ with $(C_2H_5)$, $CH_3$, $CH_2$, $CH_3$, $CH_3$ |

Example 17

A mixture of 15.7 g. of 1,1,3,3-tetramethyl-1,3-disilacyclobutane (prepared in 51% yield by the procedure of Kriner, J. Org. Chem., 29, 1601 (1964) and 0.20 g. of platinum on carbon was heated in a 200 ml. flask under nitrogen. A vigorously exothermic polymerization occurred as the temperature reached 90° C. which carried the flask temperature to 150° C. The resulting polymer was dissolved in carbon tetrachloride and hexane and filtered. Removal of the solvent at reduced pressure gave 12.8 g. of a clear, pliable polymer. This polymer, which resembles polyisobutylene, will flow during a period of several days at 25°.

The infrared spectrum of the polymer showed the expected strong absorption characteristic of $SiCH_2Si$ at 9.5μ. (This absorption is displaced to 10.7μ in the highly strained disilacyclobutane.) The $H^1$n.m.r. spectrum showed the expected singlets at τ 10.24 and 9.95 for $SiCH_2Si$ and $SiCH_3$, respectively, in a ratio of 1.94:6.00 (These absorptions are shifted to τ 10.00 and 9.77 in the disilacyclobutane), indicating that the polymer consisted of $$[-\underset{CH_3}{\overset{CH_3}{\underset{|}{\overset{|}{Si}}}}CH_2\underset{CH_3}{\overset{CH_3}{\underset{|}{\overset{|}{Si}}}}CH_2-]$$

units.

Similar polymers were produced by heating 1,1,3,3-tetramethyl-1,3-disilacyclobutane at 100° C. for 16 hr. with catalytic amounts of chloroplatinic acid dissolved in isopropyl alcohol. No polymerization of this heterocyclic occurred at 100° C. in the absence of the platinum catalyst.

Example 18

Equivalent results are obtained when the above disilacyclobutane is replaced with 1,3-bis-3,3,3-trifluoropropyl-1,3-dimethyl-1,3-disilacyclobutane. The resulting polymers are less readily soluble in hydrocarbon solvents than the product of Example 17.

Example 19

To a mixture of 142.4 g. of 1,1,3,3-tetramethyl-1,3-disilacyclobutane and 1.886 g. of 1-vinyl-1,3,3-trimethyl-1,3-disilacyclobutane, there was added 6 drops of an 18 weight percent solution of chloroplatinic acid in dimethyl phthalate, while the mixture was maintained at 96° C.

A gum was formed in one minute which consisted essentially of $$[-\underset{CH_3}{\overset{CH_3}{\underset{|}{\overset{|}{Si}}}}CH_2\underset{CH_3}{\overset{CH_3}{\underset{|}{\overset{|}{Si}}}}CH_2-]$$

units, but which contained a minor number of $$[-\underset{CH=CH_2}{\overset{CH_3}{\underset{|}{\overset{|}{Si}}}}CH_2\text{---}\underset{CH_3}{\overset{CH_3}{\underset{|}{\overset{|}{Si}}}}CH_2-]$$

units.

Example 20

Equivalent results are obtained to the above when the 1,1,3,3-tetramethyl-1,3-disilacyclobutane ingredient is replaced with 200 g. of 1-[3,3,3-trifluoropropyl]-1,3,3-trimethyl-1,3-disilacyclobutane, the gum product consisting primarily of $$[-\underset{CH_2}{\overset{CH_3}{\underset{|}{\overset{|}{Si}}}}CH_2\underset{CH_3}{\overset{CH_3}{\underset{|}{\overset{|}{Si}}}}CH_2-]$$
$$\underset{CH_2CF_3}{}$$

units.

That which is claimed is:

1. The polymerization process comprising reacting, under substantially anhydrous conditions, (a) from 0.001 to 80 mol percent of $HSiR''_3$ with from 20 to 99.999 mol percent of

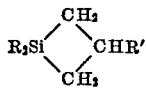

where
R is selected from the group consisting of monovalent hydrocarbon radicals free of aliphatic unsaturation and beta(perfluoroalkyl)ethyl radicals,
R' is selected from the group consisting of lower alkyl radicals and hydrogen atoms, and
R'' is selected from the group consisting of monovalent hydrocarbon and halohydrocarbon radicals free of aliphatic unsaturation halogen, alkoxy, acyloxy, and R-substituted siloxane radicals, in the presence of such amount of
(b) a platinum-containing material that there is at least 0.0001 weight percent, based on the weight of (a)+(b), present; whereby a material of the formula selected from the group consisting of

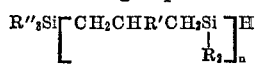

and

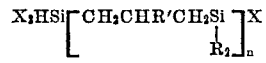

is formed, where $n$ has a value of at least 1 and X is a halogen atom.

2. The polymerization process comprising reacting, under substantially anhydrous conditions,
(a) from 0.001 to 80 mol percent of $HSiR''_3$ with from 20 to 99.999 mol percent of

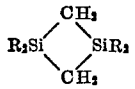

where
R is selected from the group consisting of monovalent hydrocarbon radicals free of aliphatic unsaturation and beta(perfluoroalkyl)ethyl radicals, and R'' is selected from the group consisting of monovalent hydrocarbon and halohydrocarbon radicals free of aliphatic unsaturation, halogen alkoxy, acetoxy, and R-substituted siloxane radicals, in the presence of such amount of
(b) a platinum-containing material that there is at least 0.0001 weight percent, based on the weight of (a)+(b), presently; whereby a material of the formula selected from the group consisting of

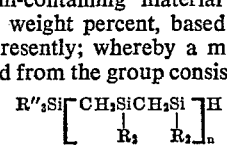

and

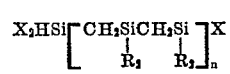

is formed, where $n$ has a value of at least 1 and X is a halogen atom.

3. A composition of the formula selected from the group consisting of

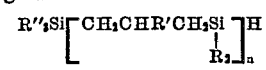

and

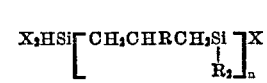

where
R is selected from the group consisting of monovalent hydrocarbon radicals free of aliphatic unsaturation and beta(perfluoroalkyl)ethyl radicals,
R' is selected from the group consisting of lower alkyl radicals and hydrogen atoms, R'' is selected from the group consisting of hydrocarbon and halohydrocarbon radicals free of aliphatic unsaturation, halogen, alkoxy, acetoxy, and R-substituted siloxane radicals,
X is a halogen atom, and
$n$ has a value of at least 10.

4. The composition of claim 3 having the general formula $$X_2HSi[CH_2CHRCH_2Si]_nX$$
$$\quad\quad\quad\quad\quad\;\; R_2$$

5. A composition of the formula selected from the group consisting of

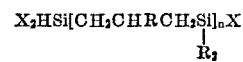

and

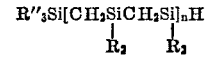

where
R is selected from the group consisting of monovalent hydrocarbon radicals free of aliphatic unsaturation and beta(perfluoroalkyl)ethyl radicals,
R'' is selected from the group consisting of hydrocarbon and halohydrocarbon radicals free of aliphatic unsaturation, halogen, alkoxy, acetoxy, and R-substituted siloxane radicals,
X is a halogen atom and
$n$ has a value of at least 10.

6. The composition of claim 5 having the general formula

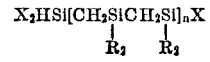

7. A method of polymerizing a compound of the formula
(a)

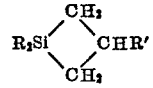

where R is selected from the group consisting of monovalent hydrocarbon radicals free of aliphatic unsaturation and beta(perfluoroalkyl)ethyl radicals and R' is selected from the group consisting of lower alkyl radicals and hydrogen atoms, comprising contacting said compound under substantially anhydrous conditions with said amount of
(b) a platinum-containing material that there is at least 0.0001 weight percent of platinum present, based on the weight of (a)+(b).

8. The method of claim 7 where (a) is 1,1-dimethyl-1-silacyclobutane.

9. The method of claim 7 wherein (a) is 1,1-diphenyl-1-silacyclobutane.

10. The method of claim 7 where (b) is chloroplatinic acid.

11. The method of claim 7 wherein there is added to (a) a minor amount of 1,3,3-trimethyl-1-vinyl-1,3-disilacyclobutane before polymerization.

References Cited

UNITED STATES PATENTS

| | | | |
|---|---|---|---|
| 2,618,646 | 11/1952 | Hatcher et al. | 260—448.2 |
| 2,850,514 | 9/1958 | Knoth | 260—448.2 |
| 3,046,291 | 7/1962 | Sommer | 260—448.2 |
| 3,139,448 | 6/1964 | Hardy et al. | 260—448.2 |
| 3,178,392 | 4/1965 | Kriner | 260—448.2 XR |
| 3,293,194 | 12/1966 | Lovie et al. | 260—448.2 XR |
| 3,398,178 | 8/1968 | Nelson | 260—448.2 |

TOBIAS E. LEVOW, *Primary Examiner.*

U. P. PODGORSKI, *Assistant Examiner.*

U.S. Cl. X.R.

252—49.6; 260—46.5